(12) United States Patent
Gratzer et al.

(10) Patent No.: US 12,271,402 B2
(45) Date of Patent: Apr. 8, 2025

(54) METHOD, PRODUCT, AND SYSTEM TO PROVIDE A PARSER FOR PROPERTY GRAPH QUERIES WITH PRECISE ERROR REPORTING AND AUTO-COMPLETION BASED ON INFORMATION FROM PROPERTY GRAPH SCHEMAS

(71) Applicant: Oracle International Corporation, Redwood Shores, CA (US)

(72) Inventors: Florian Gratzer, Mountain View, CA (US); Oskar Van Rest, Los Gatos, CA (US); Vlad Ioan Haprian, Zurich (CH); Vasileios Trigonakis, Zurich (CH); Korbinian Schmid, Austin, TX (US); Steven Serra, Arlington, MA (US); Sungpack Hong, Palo Alto, CA (US); Hassan Chafi, Las Vegas, NV (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 17/808,083

(22) Filed: Jun. 21, 2022

(65) Prior Publication Data

US 2023/0409610 A1 Dec. 21, 2023

(51) Int. Cl.
*G06F 16/29* (2019.01)
*G06F 16/21* (2019.01)
*G06F 16/242* (2019.01)

(52) U.S. Cl.
CPC ............ *G06F 16/29* (2019.01); *G06F 16/211* (2019.01); *G06F 16/2433* (2019.01)

(58) Field of Classification Search
CPC ..... G06F 16/29; G06F 16/211; G06F 16/2433
See application file for complete search history.

(56) References Cited

U.S. PATENT DOCUMENTS 5,805,863 A 9/1998 Chang
5,822,587 A 10/1998 Mcdonald et al.
(Continued)

OTHER PUBLICATIONS

"Graph processing with SQL Server andAzure SQL Database," via The Wayback Machine, dated Oct. 1, 2021.
(Continued)

*Primary Examiner* — Kuen S Lu
(74) *Attorney, Agent, or Firm* — Vista IP Law Group, LLP

(57) ABSTRACT

A method, apparatus, and product to provide a parser for property graph queries with precise error reporting and auto-completion based on information from property graph schemas. The approach generally comprises analysis of graph queries prior to their execution to identify issues prior to execution. In some embodiments, the approach includes any of: use of a property graph schema to determine whether names in a received property graph query exist within a corresponding property graph; determining whether the property graph query includes a comparison of mismatched data types; providing an autocomplete suggestion feature for assistance in resolving errors or corresponding to a cursor position within a query string; or evaluation of a property graph query to determine whether it would return an empty result. In some embodiments, property graph query analysis is performed using a context aware approach.

20 Claims, 16 Drawing Sheets

(56) References Cited

U.S. PATENT DOCUMENTS

| | | | |
|---|---|---|---|
| 6,883,161 | B1 | 4/2005 | Chovin et al. |
| 6,922,830 | B1 | 7/2005 | Schmidt |
| 7,478,375 | B1 | 1/2009 | Kersters |
| 8,037,108 | B1 | 10/2011 | Chang |
| 8,910,134 | B2 | 12/2014 | Hong et al. |
| 8,949,811 | B2 | 2/2015 | Murthy |
| 10,614,126 | B2 | 4/2020 | Van Rest et al. |
| 11,620,311 | B1* | 4/2023 | Kumar .................. G06F 16/283 707/602 |
| 2004/0128661 | A1 | 7/2004 | Ghosh et al. |
| 2004/0133747 | A1 | 7/2004 | Coldewey |
| 2005/0278451 | A1 | 12/2005 | Yamashita |
| 2005/0289125 | A1 | 12/2005 | Liu et al. |
| 2007/0192306 | A1 | 8/2007 | Papakonstantinou et al. |
| 2010/0023700 | A1 | 1/2010 | Chen et al. |
| 2010/0169758 | A1 | 7/2010 | Thomsen et al. |
| 2011/0055819 | A1 | 3/2011 | Doyle et al. |
| 2011/0099541 | A1 | 4/2011 | Blomstedt et al. |
| 2011/0138190 | A1* | 6/2011 | Chase ................... H04L 9/0656 713/189 |
| 2011/0138369 | A1 | 6/2011 | Chandra et al. |
| 2011/0239197 | A1 | 9/2011 | Dayan et al. |
| 2011/0276962 | A1 | 11/2011 | Chambers et al. |
| 2013/0031536 | A1 | 1/2013 | De et al. |
| 2013/0097136 | A1 | 4/2013 | Goldberg |
| 2013/0139135 | A1 | 5/2013 | Ditu et al. |
| 2014/0019949 | A1 | 1/2014 | Craymer |
| 2014/0189665 | A1 | 7/2014 | Hong et al. |
| 2014/0282384 | A1 | 9/2014 | Pamer |
| 2014/0306964 | A1 | 10/2014 | Reddish et al. |
| 2014/0310619 | A1 | 10/2014 | Fickenwirth et al. |
| 2014/0325666 | A1 | 10/2014 | Gkoulalas-Divanis et al. |
| 2015/0007154 | A1 | 1/2015 | Bharadwaj et al. |
| 2015/0019463 | A1* | 1/2015 | Simard ................... G06F 40/30 706/12 |
| 2015/0040110 | A1 | 2/2015 | Adl-Tabatabai et al. |
| 2015/0052175 | A1 | 2/2015 | Bornea et al. |
| 2015/0067639 | A1 | 3/2015 | Pizlo |
| 2015/0178405 | A1 | 6/2015 | Hong et al. |
| 2015/0331683 | A1 | 11/2015 | Sevenich et al. |
| 2015/0350324 | A1 | 12/2015 | Hu et al. |
| 2015/0355891 | A1 | 12/2015 | Angerer |
| 2016/0019228 | A1 | 1/2016 | Hong et al. |
| 2016/0026680 | A1 | 1/2016 | Banerjee et al. |
| 2016/0048607 | A1 | 2/2016 | Raman et al. |
| 2016/0055184 | A1 | 2/2016 | Fokoue-nkoutche et al. |
| 2016/0062776 | A1 | 3/2016 | Stanfill et al. |
| 2016/0117358 | A1 | 4/2016 | Schmid et al. |
| 2016/0171108 | A1* | 6/2016 | Chen ................... G06F 16/3322 707/767 |
| 2016/0179883 | A1* | 6/2016 | Chen ................... G06F 16/2282 707/741 |
| 2017/0024192 | A1 | 1/2017 | Hong et al. |
| 2019/0370370 | A1* | 12/2019 | Wittern ............. G06F 16/24556 |
| 2020/0042628 | A1* | 2/2020 | Foo ........................ G06F 16/258 |
| 2021/0357927 | A1* | 11/2021 | Kita ................. G06Q 20/38215 |
| 2023/0045347 | A1* | 2/2023 | Grady ...................... G06N 5/02 |

OTHER PUBLICATIONS

Dolby, "Automatic Inline Allocation of Objects", Proceedings of the ACM SIGPLAN Conference on Programming Language Design and Implementation, dated Jun. 1997, vol. 32, Issue 5, pp. 7-17.

Non-Final Office Action for U.S. Appl. No. 14/805,897 dated Feb. 17, 2017.

Sevenich et al., "Using Domain-Specific Languages for Analytic Graph Database", VLDB Endowment, dated Sep. 2016, pp. 1257-4268.

Schiller et al., "Efficient Data Structures for Dynamic Graph Analysis", IEEE, dated Nov. 2015, pp. 497-504.

Perez et al., "Ringo: Interactive Graph Analytics on Big-Memory Machines", ACM, SIGMOD, dated May 2015, 6 pages.

Hong et al., "Simplifying Scalable Graph Processing Wraith a Domain-Specific Language", ADM, CGO'14, pp. 208-218.

Hong et al., "Green-Marl: A DSL for Easy and Efficient Graph Analysis", dated 2012 ACM, ASPLOS'12, pp. 349-362.

Hong et al., "Early Experiences in Using a Domain-Specific Language for Large-Scale Graph Analysis", ACM, Grades, dated 2013, pp. 1-6.

Bak et al., "A Reference Interpreter for the Graph Programming Language GP 2", Proc. Graphs as Models (GaM 2015), vol. 181, dated Apr. 2015, 17 pages.

Non-Final Office Action for U.S. Appl. No. 14/805,882 dated Feb. 14, 2016.

Notice of Allowance for U.S. Appl. No. 14/805,882 dated Sep. 28, 2016.

Notice of Allowance for U.S. Appl. No. 14/805,882 dated May 19, 2016.

Interview Summary for U.S. Appl. No. 14/805,897 dated Oct. 26, 2017.

Final Office Action for U.S. Appl. No. 14/805,897 dated Sep. 14, 2017.

Moran, Brian, "Adding cols. to Large MySQL Tables Quickly", https:/ Iwww.onehub.com/blog/2009 109 1151 adding -columns-to -largemysql-tables-quickly/, dated Sep. 15, 2009, 7 pages.

Notice of Allowance for U.S. Appl. No. 14/805,897 dated Jun. 26, 2018.

McKinley et al., "Improving Data Locality with Loop Transformations", ACM Transactions on Programming Languages and System (TOP LAS), vol. 18 Issue 4, pp. 424-453 (Year: 1996).

Advisory Action for U.S. Appl. No. 14/805,897 dated Dec. 20, 2017.

\* cited by examiner

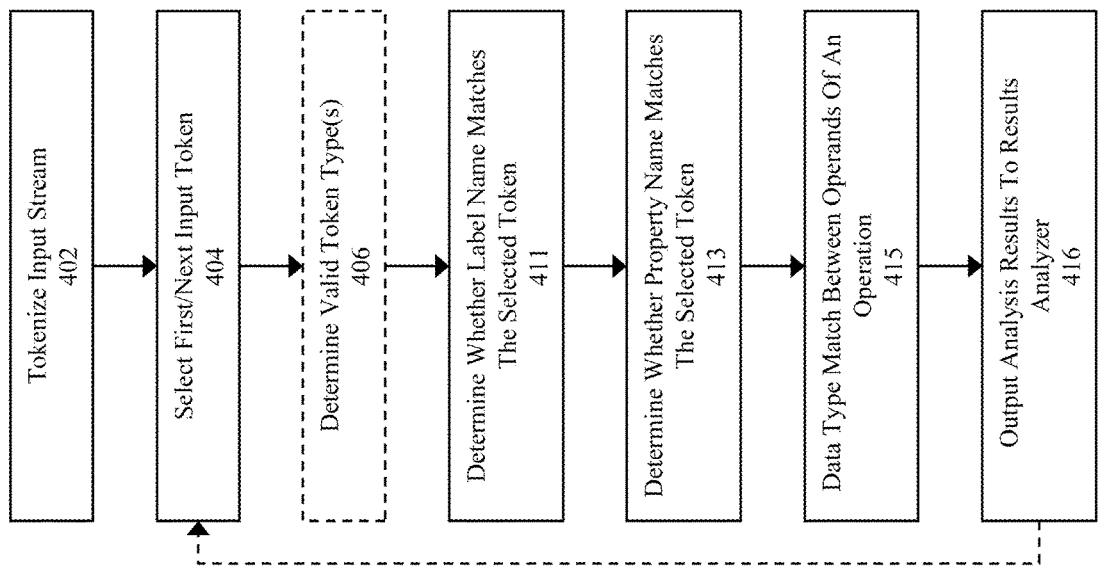
FIG. 4A1

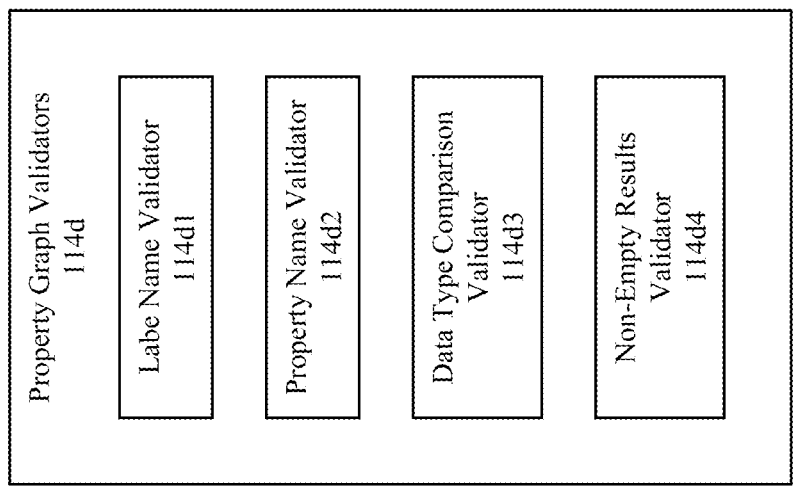
FIG. 4A2

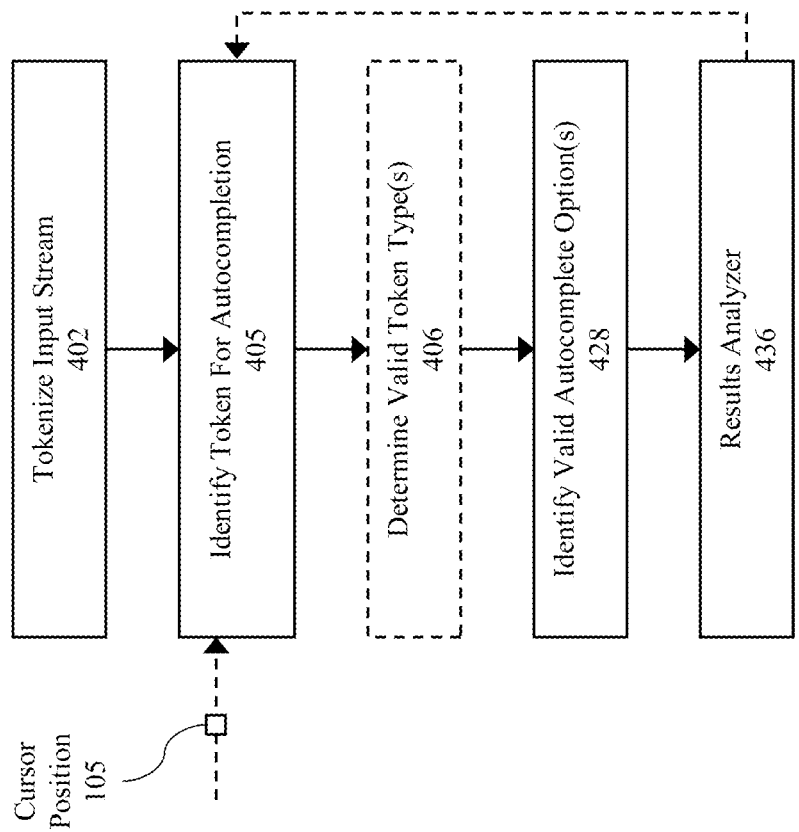
FIG. 4B1

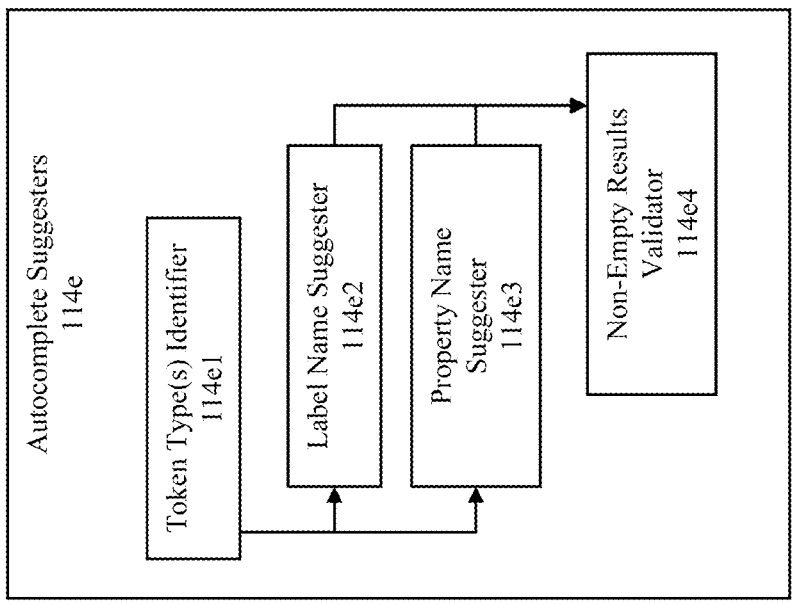
FIG. 4B2

METHOD, PRODUCT, AND SYSTEM TO PROVIDE A PARSER FOR PROPERTY GRAPH QUERIES WITH PRECISE ERROR REPORTING AND AUTO-COMPLETION BASED ON INFORMATION FROM PROPERTY GRAPH SCHEMAS

BACKGROUND

Modern computing systems handle large amounts of data. For single user/device data storage systems this often corresponds to gigabytes and even terabytes of data. However, in the context of network environments, such as in a cluster, where multiple users or services are provided, the amount of data to be managed is often in the order of petabytes of data, or more, some of which may be shared by multiple users or used to provide services to multiple users. One type of tool used to interact with at least a subset of this data is graph analysis tools that allow for queries of the graph data.

Generally, the current approach to processing graph queries, including property graph queries, comprises attempting to execute the graph queries. It is only after the execution of the query has begun that any detection of issues might occur. Additionally, as a side effect to the immediate attempt to execute the corresponding query users are provided with little feedback that might help them identify what if any issue occurred. Similarly, a user might receive an empty result and be left wondering whether the result is empty because the corresponding combination of inputs filters out all results, or because the query included a mismatch between a name in the input and an existing name within the graph to be searched or a comparison that operates of incompatible data types.

Therefore, there is a need for an improved approach to provide productive feedback to users in regard to property graph queries.

SUMMARY

Embodiments of the present disclosure provide a method, product, and system to provide a parser for property graph queries with precise error reporting and auto-completion based on information from property graph schemas.

The approach disclosed herein generally comprises analysis of graph queries (e.g., in an input stream) prior to their execution for the purpose of identifying issues (e.g., errors) with those graph queries. In some embodiments, the approach includes the use of a property graph schema to determine whether a name (e.g., label or property) used in a received property graph query exists within the corresponding property graph to be queried or whether the property graph query includes a comparison to mismatched data types. One or more functions may be identified within the property graph query, user defined or otherwise, that are analyzed to determine a type of data returned for identification of a mismatch in data types of a comparison. In some embodiments, an autocomplete suggestion feature is provided for assistance in resolving errors (e.g., suggesting valid names in the event of an error), which may be presented at a location corresponding to a cursor position within a query string. Further, a property graph query may be evaluated to determine whether an otherwise valid query would return an empty result. In some embodiments, property graph query analysis is performed using a context aware approach such that other terms within the query are used to narrow the portion(s) of the property graph schema used for evaluation.

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

FIG. 4A1 illustrates a more detailed flow for processing an input stream against a corresponding property graph schema according to some embodiments.

FIG. 4A2 illustrates a more detailed view of the property graph validators according to some embodiments.

FIG. 4B1 illustrates a more detailed flow for processing an input stream against a corresponding property graph schema to generate autocomplete suggestions according to some embodiments.

FIG. 4B2 illustrates a more detailed view of the autocomplete suggesters according to some embodiments.

DETAILED DESCRIPTION OF THE EMBODIMENTS OF THE DISCLOSURE

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Figure 1A:
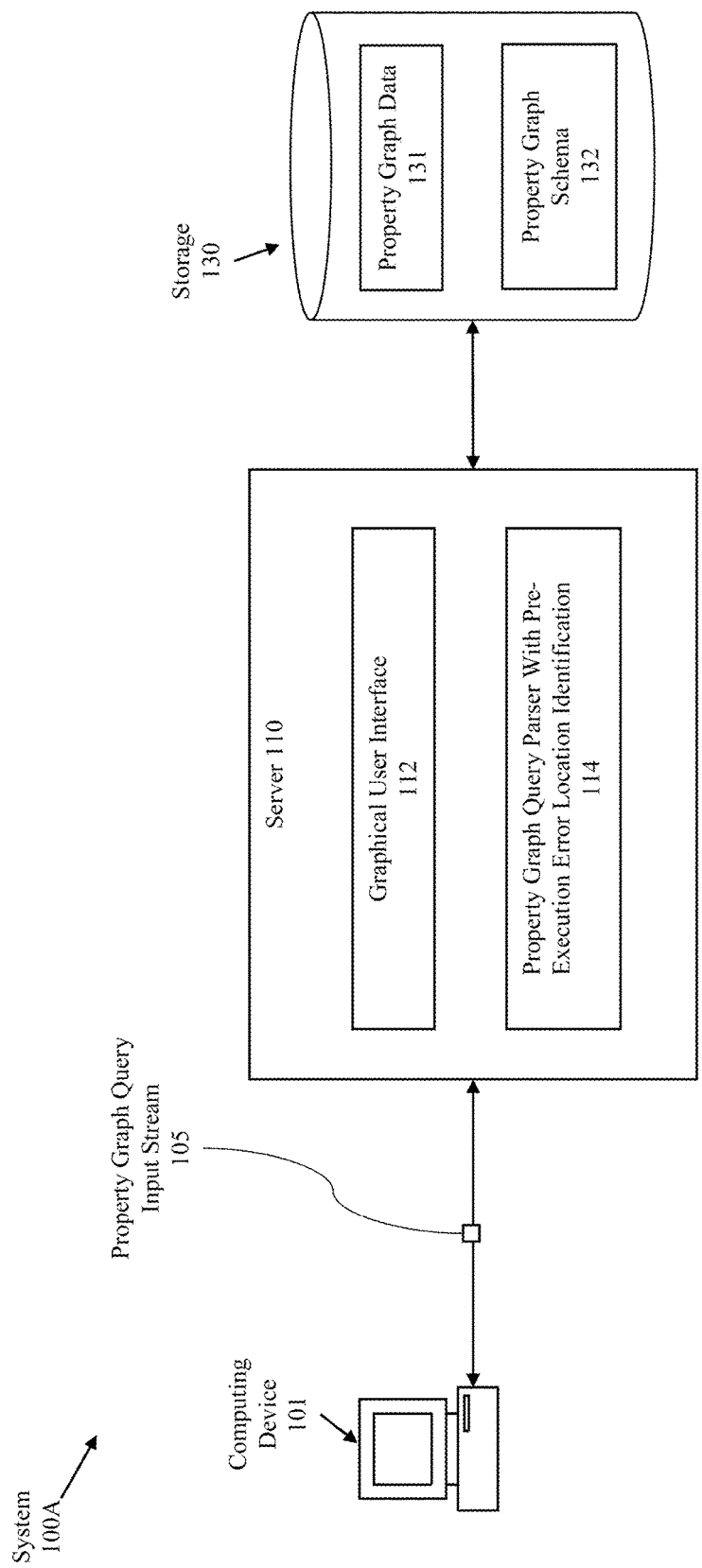
FIGS. 1A-1B illustrate example systems in which some embodiments of the disclosure are implemented.
Figure 1B:
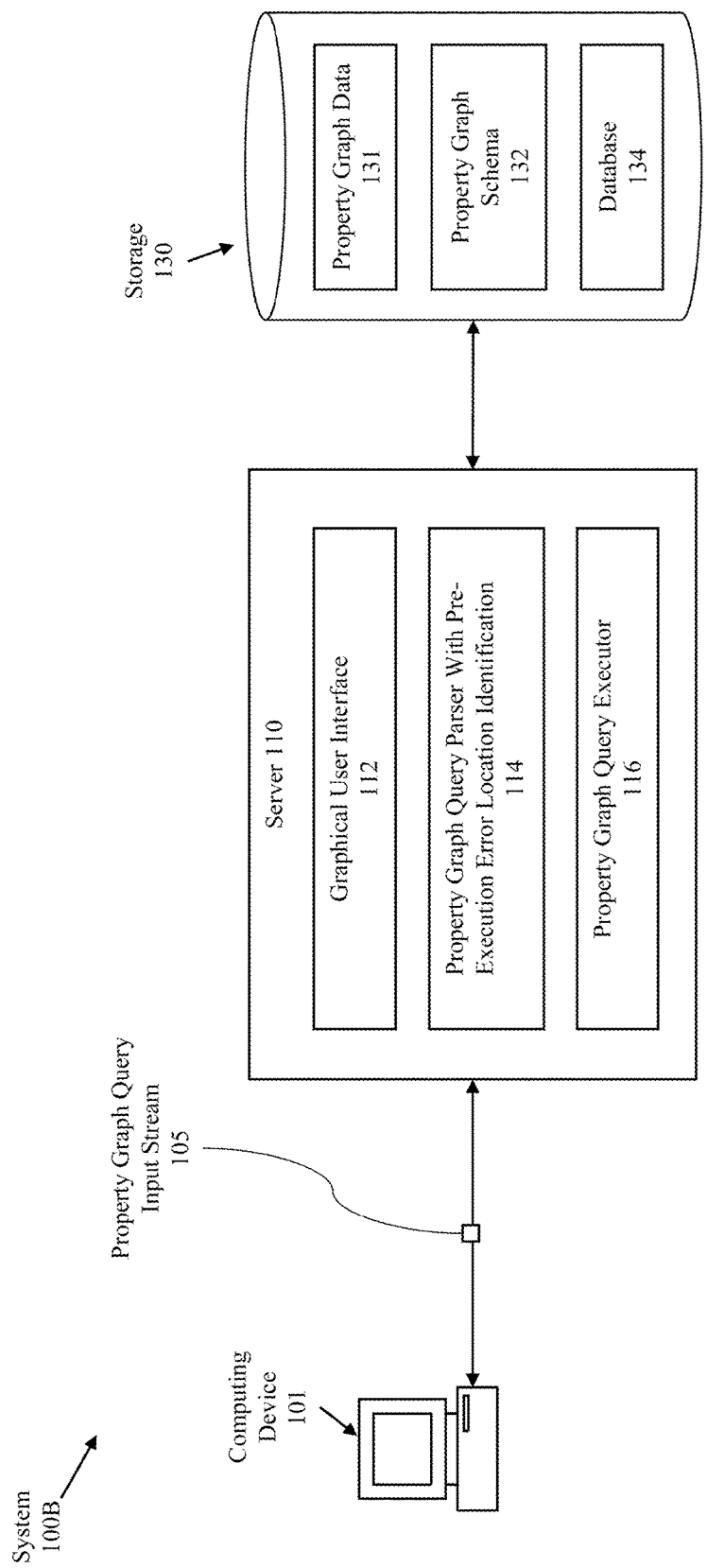

FIGS. 1A-1B illustrate example systems in which some embodiments of the disclosure are implemented.

FIG. 1A provides a first illustration of an example system in which some of the embodiments of the disclosure are implemented. Generally, the system includes a computing device, a server, and a storage. The server includes a graphical user interface and a property graph query parser as disclosed here. The storage includes a property graph schema and property graph data. As will be discussed further the property graph query parser (herein parser) interacts with a least the property graph schema to perform precise error reporting based on information for received property graph queries.

The system 100A comprises a computing device 101, a server 110, and a storage 130. The server may include a graphical user interface 112 and a property graph query parser with pre-execution error location identification 114. The storage may comprise a first set of data (property graph data 131) and a second set of data (property graph schema 132).

The computing device 101 interacts with the server having the property graph query processor 114 to execute one or more queries on the property graph data 131. The parser may process a received query against the property graph schema 132 to determine whether any issues (e.g., errors) exist within the received query prior to executing the query against the property graph data 131. Furthermore, the computing devices might be controlled by a user, another service, an administrator, or comprise any other computing device that allows for interaction with the server having the parser. The computing device might subsequently receive results from processing the received query or an identification of one or more issues with the received query. In some embodiments, the computing device interacts with the server via a graphical user interface 112 on the server 110 that interfaces with the parser and a property graph is queried through graph pattern matching queries. Generally, property graph queries may be executed through APIs via "database drivers" like Java Database Connectivity (JDBC), in a shell, or in some other kind of editor.

The computing device 101 comprises any type of computing device that may be used to operate or interface with the parser, whether directly or indirectly. Examples of such user computing devices 101 include workstations, personal computers, laptop computers, or remote computing terminals. User computing devices 101 may also comprise any type of portable tablet device, including for example, tablet computers, and portable readers. User computing device 101 may also include mobile telephone devices relating to any mobile device that can suitably access any computing systems on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet. One of ordinary skill in the art may appreciate that embodiments of this present disclosure may be implemented on the Internet, on a closed network, on a hybrid open and closed network, or on a cloud network.

The server 110, may comprise any combination of consumer or business grade computing devices such as a rack server, a commodity computing device, or any other type of computing device. In some embodiments, the server includes a graphical user interface 112 and the property graph query parser with pre-execution error location identification 114.

In some embodiments, the graphical user interface 112 can comprise any of an API for accessing the storage that processes a property graph query using the parser. In some embodiments, the graphical user interface may be provided by the server 110, another server, or the computing device 101, and may allow for access to the parser 114. As will be discussed below, the graphical user interface 112 may comprise various different arrangements of visual elements that allow for receipt of a property graph query and identification of the items within that property graph query that correspond to an error.

In some embodiments, the property graph query parser with pre-execution error location identification 114 operates on a query received from a user, e.g., via computing device 101 providing an input stream (see property graph query input stream). Generally, the parser processes a received query to identify different names (e.g., vertex, edge, or property names). The parser may also perform processing relevant to operators (e.g., less-than in a where clause such as if X<Y) to determine whether the names of the operands exist and/or to determine whether the operands for any corresponding operators are of a type that can be evaluated according to the corresponding operator. In some embodiments, the parser also provides autocompletion suggestions based on partial or heuristic matching to know information from the property graph schema whether alone or in combination with the property graph data. Further details regarding the parser are provided herein.

In some embodiments, the storage 130 includes property graph data 131 and a property graph schema 132. In some embodiments, a property graph comprises a representation of vertices and edges where the vertices and/or edges may be named and have one or more properties. For example, a vertex representing a person might be associated with a property identifying an amount of a salary for that person and an edge property might be identified when an edge is relevant such as a property identifying the days of the week an employee works in the office where the corresponding edge connects a vertex identifying the person to a vertex identifying the office with an edge name comprising Works_At). Each vertex, property, and edge is associated with a name within the property graph. Each type of relationship in the property graph can be represented as a relationship in a schema where those particular relationships fit within the relationships identified within the schema. In some embodiments, the storage 130 includes a plurality of sets of property graph data and one or more property graph schemas corresponding to the plurality of sets of property graph data. The property graph may be an abstract data model that may have different concrete representations such as a set of database tables. For example, a table named "PERSONS" may be used to create a set of vertices (nodes) named "Person" such that each row in the table becomes a vertex (node) and such that each column of the table becomes a property of the vertices. Other possible representations include RDF triple sets, XML, or JSON documents, and adjacency lists with key/value style properties.

FIG. 1B provides a second illustration of an example system in which some of the embodiments of the disclosure are implemented. The illustration provided in FIG. 1B adds additional elements to the illustration of FIG. 1A including a property graph query executor and a database 134.

As discussed in regard to FIG. 1B, the description of like number elements from FIG. 1A are applicable to the description of FIG. 1B (see computing device 101, property graph query input stream 105, server 110 having a graphical user interface 112 and a property graph query parser with pre-execution location identification 114, storage 130 having property graph data 131, and property graph schema 132). However, in contrast to system 100A illustrated in FIG. 1A, system 100B illustrated in FIG. 1B also includes a property graph query executor 116 within server 110 and a database 134 in storage 130.

In some embodiments, the parser 114 interfaces with a property graph query executor 116 to cause the execution of a property graph query received at an input stream (see e.g., 105) when the parser determines that no errors are contained within a received query, by forwarding the property graph query to the property graph query executor 116. In some embodiments, the queries are executed or received using APIs or query shells and the error messages are represented as a set of characters, either inside an exception stack trace or as a shell output. In some embodiments, the precise location of an error is identified by including a corresponding line number, starting column in the line, and end column in the line. In some embodiments, the location information is used to generate one or more carets (A) or other markers to point to the characters that make up the erroneous portion of the query (e.g., in an API or query shell). In some embodiments, the location information is used to modify the visual representation of the indicated text to bring the error to a user's attention (e.g., highlighting, color changes, or various other types of emphasis).

As disclosed herein, a property graph schema can be represented by a graph, a plurality of entries in a relational database table (e.g., in database 134), or any other approach representable and searchable by a computing system. In some embodiments, the property graph comprises a collection of references to database table entries, without reproducing the tabular entries in a separate structure.

Figure 2A:
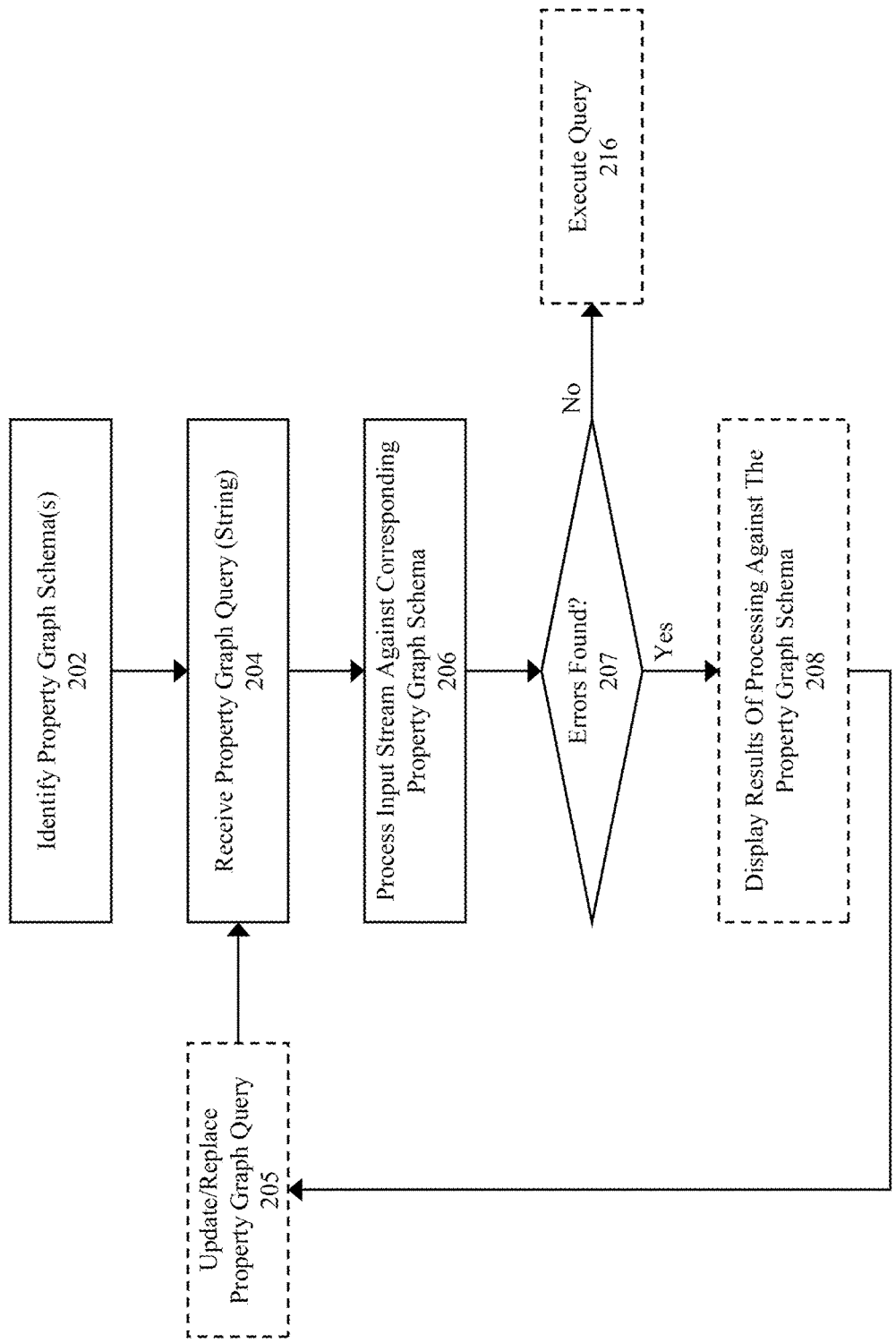
FIG. 2A illustrates a flow for processing property graph queries with precise error reporting and auto-completion based on information from property graph schemas according to some embodiments.

FIG. 2A illustrates a flow for processing property graph queries with precise error reporting and auto-completion based on information from property graph schemas according to some embodiments.

In some embodiments, the process starts at 202 where a property graph schema is identified. The property graph schema may correspond to one or a plurality of property graphs and one or a plurality of property graph schema may be maintained (e.g., at 132). In some embodiments, a property graph schema represents the names, their corresponding properties, and the data types of those properties found within a property graph or at least a subset thereof.

In some embodiments, a property graph query is received at 204. The property graph query may comprise a string or a collection of inputs that can be parsed to determine the corresponding query. For example, the property graph query may comprise a graph pattern-matching query to be executed against a corresponding property graph (see e.g., 131) which may consist of one or more vertex and/or edge patterns. Such patterns can have name expressions that can be evaluated to determine corresponding vertices (nodes) and edges that match the query. In case of property graph queries, such graph patterns may consist of one or more vertex or edge patterns. Each edge pattern may connect exactly two vertex patterns. In some embodiments, a property graph query may include a filter expression, which typically place a constraint on a property value of a vertex (node) or edge in the pattern. For example, the filter expression may constraint the property "date_of_birth" of a variable with name expression "Person" to be greater than "2000-01-01". Additionally, a query might include one or more evaluations based on one or more properties. For instance, a query might specify a pattern that matches to employees in the HR department that report to a specified supervisor and that are salaried employees (e.g., SELECT person.first_name, person.last_name FROM MATCH (person)-[:supervisor]→(SUPERVISOR) where person.employment_department='HR' and person.Salaried=TRUE).

In some embodiments, a property graph query received at 204 is processed at 206 against a corresponding property graph schema. Generally, this comprises processing to determine whether the names used (e.g., label, property, edge) represent valid names. In some embodiments, each name is validated against a list to determine whether the name exists. In some embodiments, the evaluation of each name is determined without regard to other elements within the query. Each name may also be evaluated in the context/scope of other names specified in the query, such that a set of possible names is decreased by a previously specified name. Operations can also be identified with corresponding operands being evaluated to determine whether the operand can operate on the corresponding operands (e.g., a type comparison is performed and an evaluation of whether those types can be operated on as specified by the corresponding operand). In some embodiments, a query is evaluated to determine if the query would return an empty result. A query can also be evaluated to determine whether an autocompletion suggestion should or could be provided.

If no errors are found at (see determination at 207) the query may be transmitted to a process to execute the query at 216. However, if one or more errors are found (see determination at 207) any of the follow may be performed at 208: identification of one or more detected errors in the graphical user interface or displaying autocomplete suggestions in a user readable format. For example, a name that does not match any corresponding names in the property graph schema is identified by an added emphasis (e.g., highlighting, underlining, emphasis, carrot marks) displayed in the graphical user interface. In some embodiments, the identification of the error is provided prior to execution of the query, and may be accompanied by a corresponding written statement explaining the error and/or suggesting a correction. In some embodiments, the process intercepts a received query and processes the query to perform error/issue identification. Recommendations may comprise suggested corrections of a misspelled name, an incorrect name, or a partially complete name, which may be determined and provided based on the property graph schema. In some embodiments, an autocomplete suggestion is provided for a name that is partially complete as determined based on at least a cursor position.

In some embodiments, at 205, a previously received query is updated or replaced after results of processing the previously received query is displayed. In such an event, the process may for a loop of processing and refinement/correction, which may result in a query that is executed as discussed in regard to 216.

Figure 2B:
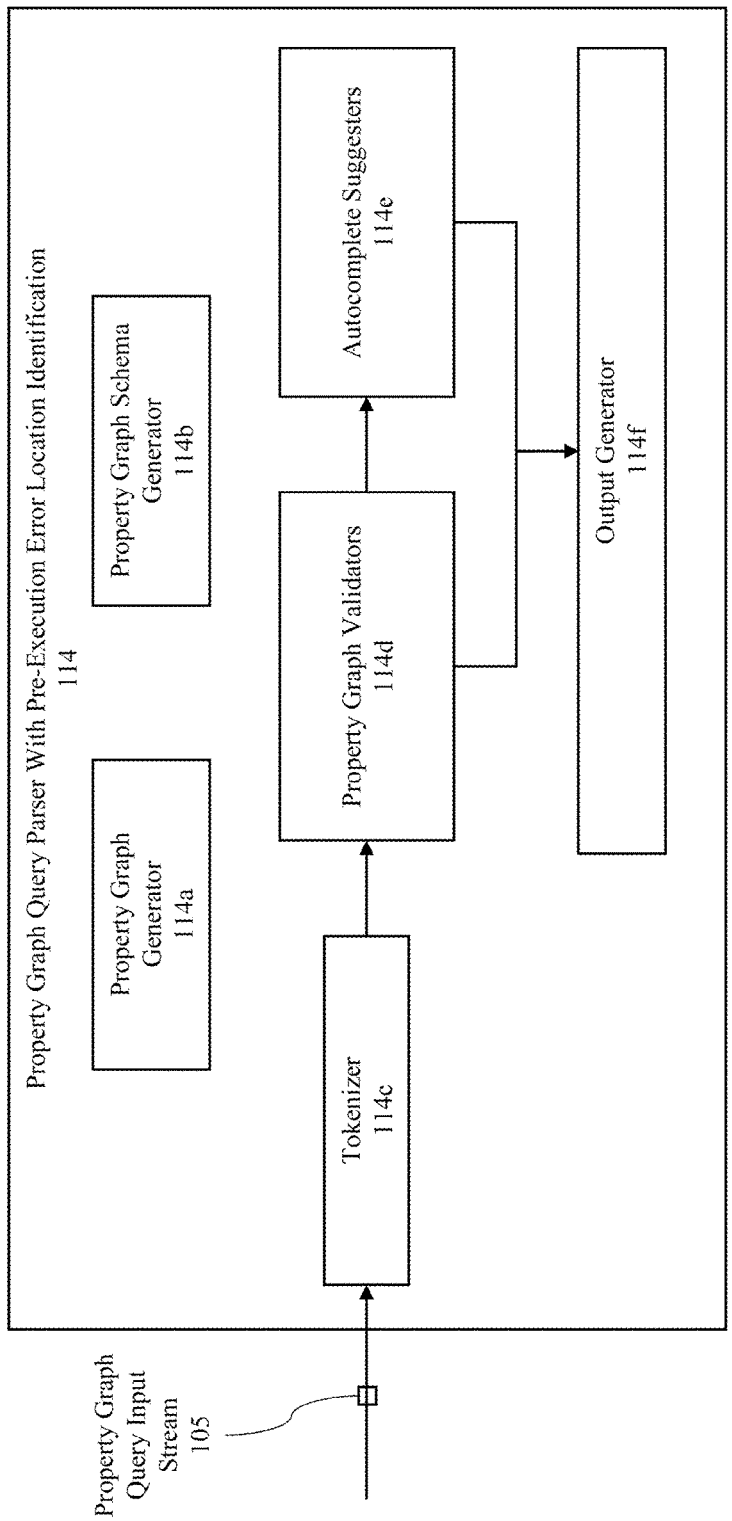
FIG. 2B illustrates a more detailed view of the property graph query parser with pre-execution error location identification according to some embodiments.

FIG. 2B illustrates a more detailed view of the property graph query parser with pre-execution error location identification according to some embodiments.

In some embodiments, the property graph query parser with pre-execution location identification (parser) 114 includes a property graph generator 114a, a property graph schema generator 114b, a tokenizer 114c, property graph validators 114d, autocomplete suggesters 114e, and an output generator 114f.

The property graph generator 114a may process a collection of tables (e.g., in the database 134) to generate one or more property graphs. For example, a plurality of interrelated tables (e.g., tables that reference or are referenced by one or more other tables) may provide information that can be mapped to vertices and edges where the vertices represent the objects of the tables. For instance, a people table might have a plurality of rows representing different respective people which are in turn associated with one or more other tables (e.g., by reference to an identifier for the other tables and/or for another person), where each table may provide one or more properties to be associated with a vertex or edge. For example, a "Persons" table having names of people that work for a company includes a column that specifies values that reference a companies table and an accounts table. In some embodiments, any other known techniques to convert a set of data into a property graph may be used to generated a property graph.

The property graph schema generator 114b processes a property graph to generate a property graph schema. For example, a property graph might be traversed to identify existing names (e.g., labels, property, and edge names), and the corresponding data types, where the identified information is maintained in a graph that associates the corresponding properties to respective names (e.g., vertices or edges). This provides a representation of possible structural relationships without providing each instance of those relationships and their corresponding values.

In some embodiments, the parser 114 processes a property graph query input stream 105 using a tokenizer 114c, property graph validators 114d, and autocomplete suggesters 114e. In some embodiments, outputs from either or both of the property graph validators 114d or autocomplete suggesters 114e are processed by an output generator 114f to determine what output should be provided by the parser.

The tokenizer 114c processes the input stream to generate a plurality of tokens. For example, the tokenizer parses characters received from the input stream 105 to identify different names and operands. Each name and operand is placed in a token, and each token is maintained in such a way as to preserve the order in which the characters underlying the token where received. Once generated the tokenized input can be passed to the property graph validators 114d and potentially to the autocomplete suggesters 114e.

The property graph validators 114d can perform various validation operations as discussed herein. Briefly, those may include validation of label, property, and edge names, validation of comparisons in the context of enforcement of like-to-like types (e.g., comparisons of things of the same type or to at least types that can be compared) and validation that the results are not empty. In the context of an empty result, an empty result may not necessarily represent a syntactical or logical error but is addressed here at least due to the limitation of current graph query processing techniques which do not provide feedback to the user to indicate why a result is empty (e.g., whether the result is empty because nothing matches valid criteria or whether the criteria is invalid). In some embodiments, the property graph validators 114d pass identified errors to autocomplete suggesters 114e. The property graph validators 114d will be discussed further below.

In some embodiments, the autocomplete suggesters 114e operate on the same tokenized input stream as the property graph validators 114d. In some embodiments, the property graph validators 114d and the autocomplete suggesters 114e work in concert where the property graph validators 114d provide an identification of an error with a token and the autocomplete suggesters 114e then determine, if one exists, a valid name, operator, or operand to suggest to a user. For example, the property graph validators 114d determine that a name (e.g., "peron") does not exist in the property graph based on analysis of the property graph schema and transmits that identification (e.g., of the token and the error) to the autocomplete suggesters 114e. The autocomplete suggesters 114e then process the token to identify one or more valid names that correspond to the token (e.g., based on pattern matching or heuristics) and uses a ranking schema to select a suggested replacement for the token (e.g., person). In some embodiments, the autocomplete suggesters 114e determine the valid names based on the context of the input stream as determined by other elements in the input stream (e.g., a collection of possible valid names is reduced by other tokens in the input stream). For instance, when an error corresponding to a property name is identified, at least a corresponding label name might be used to determine a set of property names from which an autocomplete suggestion for the property name is provided. In some embodiments, the input stream is combined with a cursor position to determine possible valid names, operands, or operators that correspond to the current token at which the cursor is positioned. Additionally, autocomplete suggestions could be limited to a token that overlaps with the cursor position. In some embodiments, the evaluation is based on the query up to the current cursor position (e.g., if the token is "peron" but the cursor position is after the "r" and before the "o", only "per" from the overlapping token would be used to generate the suggested autocomplete result. The autocomplete suggesters 114e will be discussed further below.

In some embodiments, the output generator 114f processes outputs from the property graph validators 114d and the autocomplete suggesters 114e. If we continue the "peron" example from the previous paragraph, the property graph validators 114d provide an identification of the token as invalid (e.g., representing an error in the query) and the autocomplete suggesters 114e provide a suggested valid name (e.g., "person"). The output generator 114f combines these inputs to identify specifically where the error in the query is located, which may also be used to provide a suggestion of a valid name. The output generator 114f will be discussed further below in the context of provided outputs for different errors.

Figure 3:
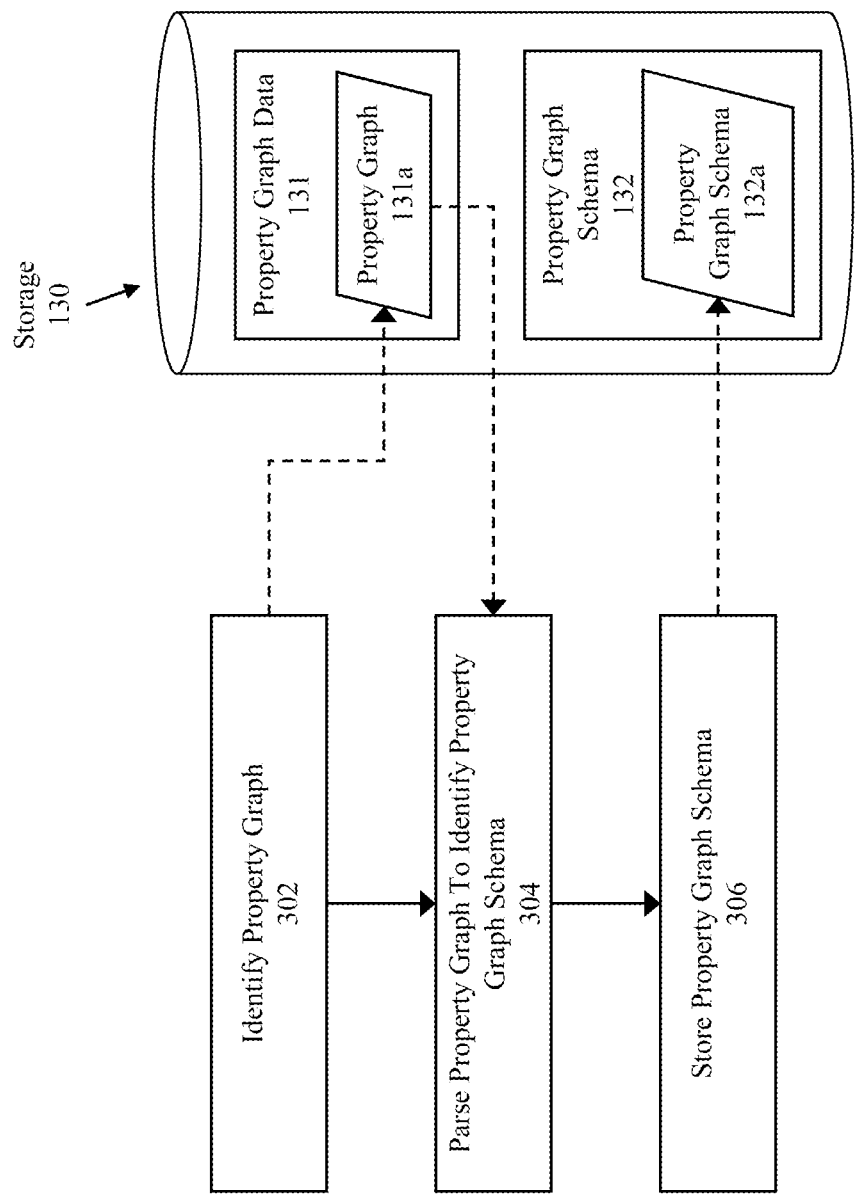
FIG. 3 illustrates a more detailed flow for identifying property graph schema(s) according to some embodiments.

FIG. 3 illustrates a more detailed flow for identifying property graph schema(s) according to some embodiments. In some embodiments, the process identifies a corresponding property graph which is parsed to generate a property graph schema. In some embodiments, a plurality of property graphs are parsed to generate one or more property graph schemas. In some embodiments, a previously generated property graph schema is selected instead of generating or regenerating a property graph schema.

At 302 a property graph is identified. For example, during an initial processing of a collection of property graph data (see 131) in storage 130 (as discussed herein), the property graph data is analyzed to detect any property graphs represented therein (see e.g., property graph 131a).

Each identification of a property graph is then passed to 304, where the corresponding property graph is parsed to identify a property graph schema. The property graph schema can be generated using any techniques disclosed herein and is stored in the property graph schema 132 (see property graph schema 132a). At 306, the generated property graph schema is stored in the property graph schema area 132 of the storage 130 for future retrieval and processing.

FIG. 4A1 illustrates a more detailed flow for processing an input stream against a corresponding property graph schema according to some embodiments. Generally, the approach provided herein comprises tokenizing an input stream and individually process each token, in order, by comparing each token to a corresponding name or operation.

At 402 a received input stream is tokenized. Briefly tokenization is the process of taking a sequence of characters and chopping it up into pieces which can be separately analyze called tokens. Generally, white space and different formatting characters and operators are used to determine where the boundaries should be placed for a token. This is applied here to separate names and operands into an ordered collection of tokens.

The separated tokens are then selected for processing at 404. For examiner, each token is then processed generally in the order they appear in within the query by selecting a single token at a time—e.g., initially a first token is selected for processing, followed by selection of a sequentially next token. as an input token.

In some embodiments, each token may be analyzed to determine a valid token type. For example, a graph query will often have an expected structure based on the prior one or more tokens already encountered. For example, if the selected token is an operator, the prior token and the next token should be a selection of a respective name (e.g., a property name) in a corresponding graph. This would indicate that a data type mismatch evaluation should be performed at 415 (e.g., for the current token representing an operation). In some embodiments, when an operator is identified, the next token is first processed to detect any property or label name mismatch at 411 and 413 respectively. Determination of a valid token type at 406 may include determining whether the token is an operator in a graph query language (e.g., SELECT, FROM, MATCH, WHERE, HAVING, ORDER BY) which is analyzed separately to detect proper syntax for the query. In some embodiments, there may be multiple valid token types for a given token.

Regardless of whether a valid token type(s) is determined at 406, each token can be processed to detect for various errors at 411, 413, and 415 respectively. For example, at 411 a determination is made as to whether the token matches a label name in the corresponding property graph schema. Similarly, at 413 a determination is made as to whether the token matches a property name in the corresponding property graph schema. Finally, at 415 a determination is made as to whether there is a mismatch between data types for operands of an operation. In some embodiments, the determination at 415 is dependent on the identification of an operation (e.g., based on a prior token), and data type mismatches may be detected after label name and property name validation is complete. For instance, when one or more operands are undefined the presumed result is a datatype mismatch. This is because the system likely cannot determine whether an unknown data type is the same as another data type (known or otherwise). In some embodiments, each match determination process performs contextual matching based on a context from the input stream (e.g., within bounds determined based on other tokens that are defined either in a preceding part of, or any part of, the query).

In some embodiments, a results analyzer 416 processes the outputs from 411, 413, and 415 to determine what results should be provided. For example, if a token corresponds to a label name (see 411) then the result from 413 is probably irrelevant and likely indicates a mismatch. This is the same for 413 where if a property name match is identified then it is likely that no match is identified for 411. In some embodiments, the token type is determined prior to execution of 411, 413, or 415 respectively (see e.g., discussion of 406 above). In some embodiments the results analyzer can determine token types based on an identification of a match at any of 411, 413, or 415.

In some embodiments, the results analyzer 416 upon a determination that each of the tokens has a corresponding match, processes the query to determine whether the query would return an empty result. For example, an empty result could be detected by processing the property graph schema to determine if the particular combination of tokens in the query do not map to a valid context. Alternatively or additionally, an empty result could be detected by analyzing the query against the property graph to determine whether at least one result would be provided. In some embodiments, the function of the results analyzer 416 are included in the output generator 114f The operations of at 411, 413, and 415 can be performed in any combination of a serial, parallel, of combination thereof. For example, the determination of the whether a property name matches the selected token and the determination of the whether a property name matches the selected token could occur in parallel while the data type match determination happens after the property and label name matching.

FIG. 4A2 illustrates a more detailed view of the property graph validators according to some embodiments. In some embodiments, the property graph validators comprise a label name validator, a property name validator, a data type comparison validator, and a non-empty results validator. The validators may be provided in any combination or separately.

The label name validator 114d1, compares a received token to a set of tokens to determine whether the received token matches at least one of the set of tokens (label names) from the property graph schema. In some embodiments, the tokens in the property graph schema are filtered (prior to matching) based on context of a received query—e.g., to ensure that the combination of names actually exist within the schema. The property name validator 114d2 operates similarly to the label name validator 114d1 but does so on property names. In some embodiments, in the context of a property name, the tokens in the property graph schema are filtered (prior to matching) based on the context of a received query to the possible valid properties for the corresponding context (e.g., the corresponding vertex or edge).

The data type comparison validator 114d3 operates on comparisons to determine whether the things being compared (e.g., the operands) are of the same type or a type that can be compared. For example, comparisons of like-to-like are generally allowed (e.g., date to date, number to number, string to string, character to character, currency to currency, boolean to boolean), whereas comparisons of different types are generally not allowed. In some embodiments, an operand is a value returned from a function (e.g., MONTH(date) before month) is analyzed based on the type of operand returned from the function. Generally, unless a specific conversion is provided, when the types of operands being compared are of different data types a mismatch will be reported.

The non-empty results validator 114d4 analyzes that query to determine whether the query would return a non-empty result. As discussed herein this may comprise comparing the query to a schema to determine if any results are possible with the given set of arguments (e.g., whether the combination is possible based on the corresponding schema). In some embodiments, determining whether the query would provide non-empty results is performed by analyzing the query against the property graph to determine if at least one result would be provided.

FIG. 4B1 illustrates a more detailed flow for processing an input stream against a corresponding property graph schema to generate autocomplete suggestions according to some embodiments. In some embodiments, the process comprises generation of autocomplete suggestions for tokens that do not match a corresponding name or corresponding operand data type. In some embodiments, autocomplete processing is triggered by the operations of the property graph validators 114d.

In some embodiments, the process starts by tokenizing the input stream at 402 as discussed above in regard to FIG. 4A1. In some embodiments, the input stream is tokenized for processing by the property graph validators 114d and that tokenizing is leveraged here.

In some embodiments, the tokens for autocompletion are identified at 405 in response to analysis by the property graph validators 114d where an identification of the corresponding name or data type comparison is used to trigger the generation of an autocomplete suggestion to the mismatched token. In some embodiments, the token identified for autocompletion is determined based on an overlap between the token and a cursor position (105).

In some embodiments, the process includes determining a valid token type(s) at 406 as discussed above in regard to FIG. 4A1. In some embodiments, determining a valid token type(s) at 406 for processing by the property graph validators 114d is leveraged here to avoid duplicate processing (e.g., autocomplete suggestions for a label name do not necessitate generation of autocomplete suggestions for a property name).

At 428 a valid autocomplete option is generated. In some embodiments, a plurality of valid autocomplete options are generated. For example, given a query and a set of already applied clauses, a collection of names is generated that may be valid options for the token. In some embodiments, the autocomplete options are ranked in the results analyzer 436. In some embodiments, the autocomplete options are identified based on a number of matching characters and a corresponding order. In some embodiments, the autocomplete options are identified using a heuristic process.

In some embodiments, the results analyzer 436 processes the would be created query to determine whether the query would return an empty result. For example, an empty result could be detected by processing the property graph schema to determine if the particular combination of tokens in the query do not map to a valid context. Alternatively or additionally, an empty result could be detected by analyzing the query against the property graph to determine whether at least one result would be provided. In some embodiments, the function of the results analyzer 436 is included in the output generator 114E In some embodiments, the results analyzer only analyzes a token corresponding to a current cursor position and may base that evaluation, at least in part, on any already received tokens (e.g., any tokens sequentially prior to the token being analyzed).

FIG. 4B2 illustrates a more detailed view of the autocomplete suggesters according to some embodiments. As disclosed herein, the autocomplete suggesters 114e and the property graph validators 114d may be integrated together and leverage shared modules and analysis for performing the indicated actions. In some embodiments, the autocomplete suggesters may comprise separate elements from the property graph validators 114d and may be organized internally as multiple separate elements or may be combined.

In some embodiments, the autocomplete suggesters 114e comprise a label name suggester 114e2 and a property name suggester 114e3 which operate on one or more tokens of an identified type (see token type(s) identifier 114e1) as discussed above in regard to FIG. 4B1.

In some embodiments, the results from the label name suggester 114e2 and the property name suggester 114e3 are analyzed by a non-empty results validator 114e4 which may be the same instance or a different instance of the non-empty results validator 114d4. However, whereas the non-empty results validator 114d4 is described as validating a validated result, here the non-empty results validator 114e4 can be used to validate the suggestions to determine whether they would result in an empty result of the query.

FIGS. 5A-5E illustrate examples for display of autocomplete suggestions or error messages according to some embodiments.

Figure 5A:
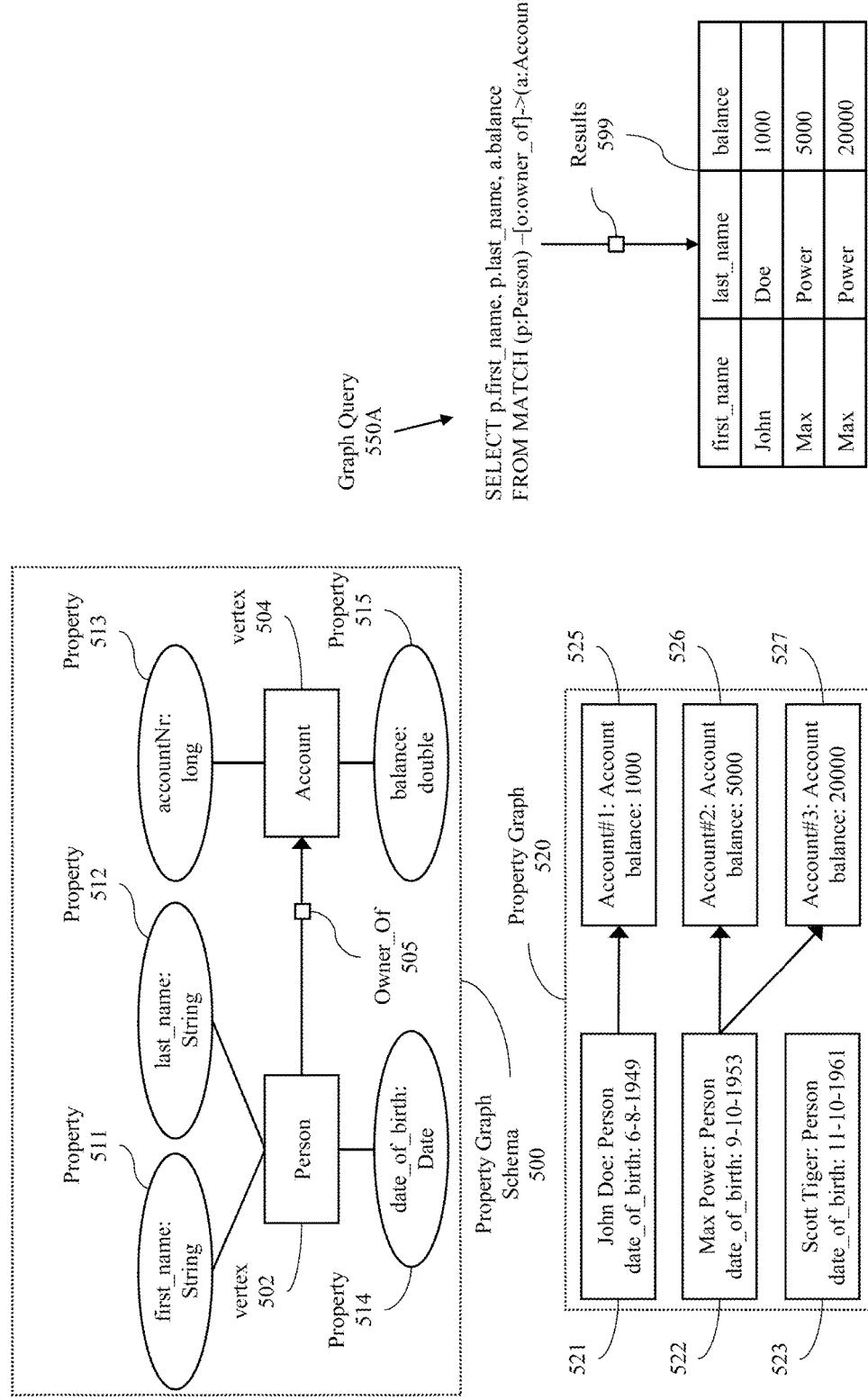
FIGS. 5A-5E illustrate examples regarding display of autocomplete suggestions or error messages according to some embodiments.

FIG. 5A provides a first illustrative example. Generally, the example illustrated in FIG. 5A includes a property graph schema, a property graph, a graph query, and a result from the property graph query.

The property graph schema 500 comprises two vertices having three and two properties respectively. The first vertex "Person" (502) has three properties named: first_name (511), last_name (512), and date_of_birth (514). The second vertex "Account" (504) has two properties named: accountNr (513) and balance (515). Additionally, each property has a corresponding data type: first_name and last_name are both of type "string" (511 and 512), accountNr is a "long" integer (513), date_of_birth is a date (514), and balance is a "double" double precision floating point number (515) representing a value in a currency. Additionally, any "Person" vertex may have a number of edges indicating they are the owner of an account (see 504).

A corresponding property graph is illustrated at 520. Here, the person vertices are illustrated on the left (see 521-523) and the account vertices are illustrated on the right (see 525-527) and the owner_of relationships are illustrated by the connecting arrows from the left to the right. As illustrated, each "Person" vertex includes a first and last name and a date of birth (DOB). Similarly, each "Account" vertex includes an account number and a balance.

Graph query 550A illustrates an example query on the property graph 520. The graph query comprise a SELECT clause (SELECT p.first_name, p.last_name, a.balance), and a FROM MATCH clause (FROM MATCH (p:Person)—[o: owner of]→(a:Account)) to cause the selection of the first name, the last name, and a corresponding balance for each account a person is the owner of Here the query is evaluated by matching the name expression (vertex and edge names).

Results of executing the graph query 550A are illustrated at 599. As provided here, the results are organized into rows and columns in a table where the first column contains corresponding first_names, the second column contains corresponding last_names, and the third column contains corresponding balances. Similarly, each row corresponds to a set of results that meet the specified MATCH condition in the property graph.

Figure 5B:
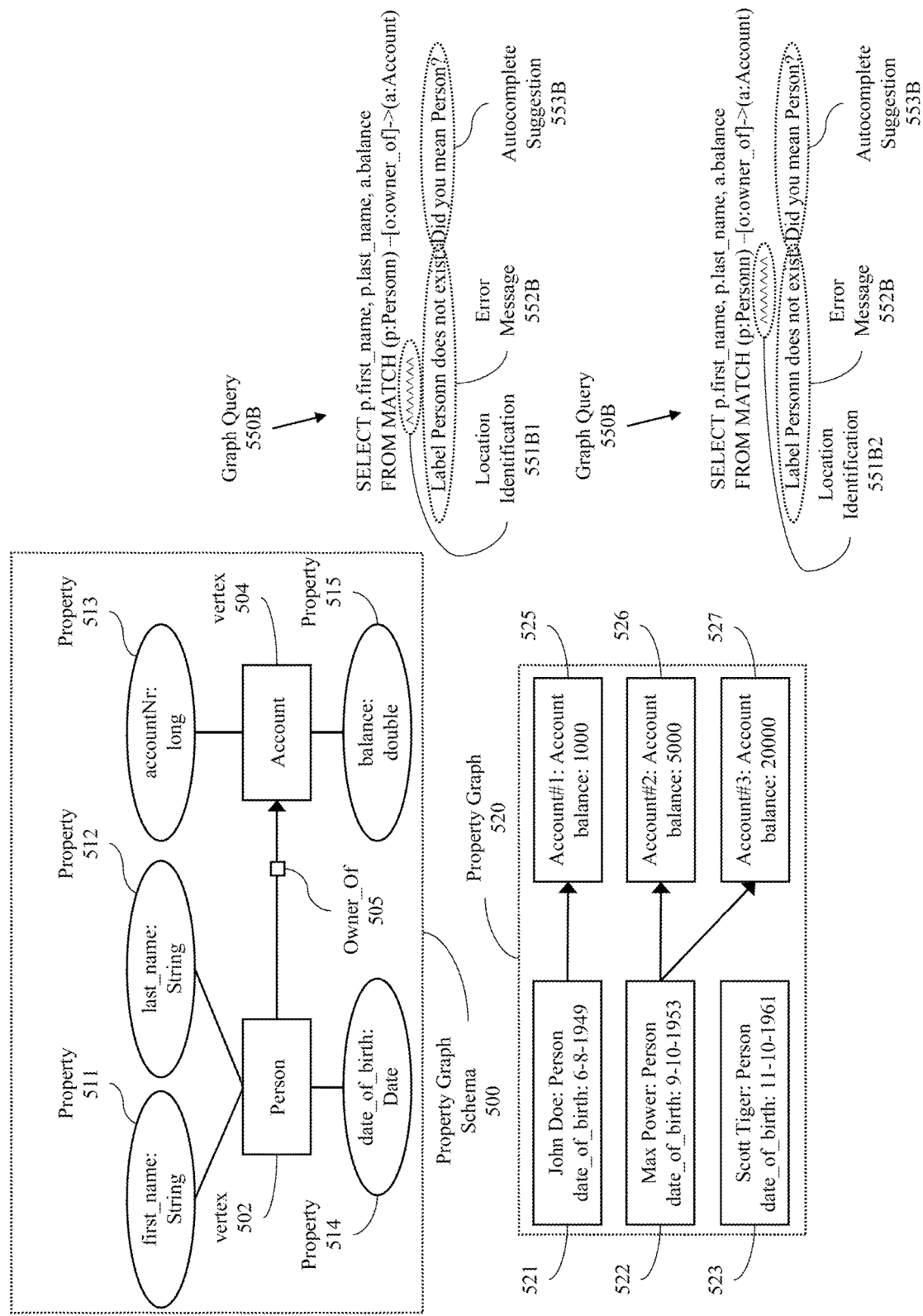

FIG. 5B provides an illustration of a presentation of an error identification corresponding to a label name. Here the property graph schema 500 and the property graph 520 are the same as illustrated in FIG. 5A, thus the description provided therein is applicable here.

For the sake of illustration, the query is identical to the graph query 550A except that an extra "n" has been added to "Person" in the FROM MATCH clause (see 550B). Here "Personn" is an error since no matching name exists. As illustrated, the location of the error is identified with caret symbols below the offending clause (551B1) or below the offending term (551B2). Additionally, an error message is provided (see 552B) and an autocomplete suggestion to correct the error (see 553B). As discussed herein, in another embodiment, a different type of emphasis could be used (e.g., underlining or changing the color to red in an integrated development environment).

Figure 5C:
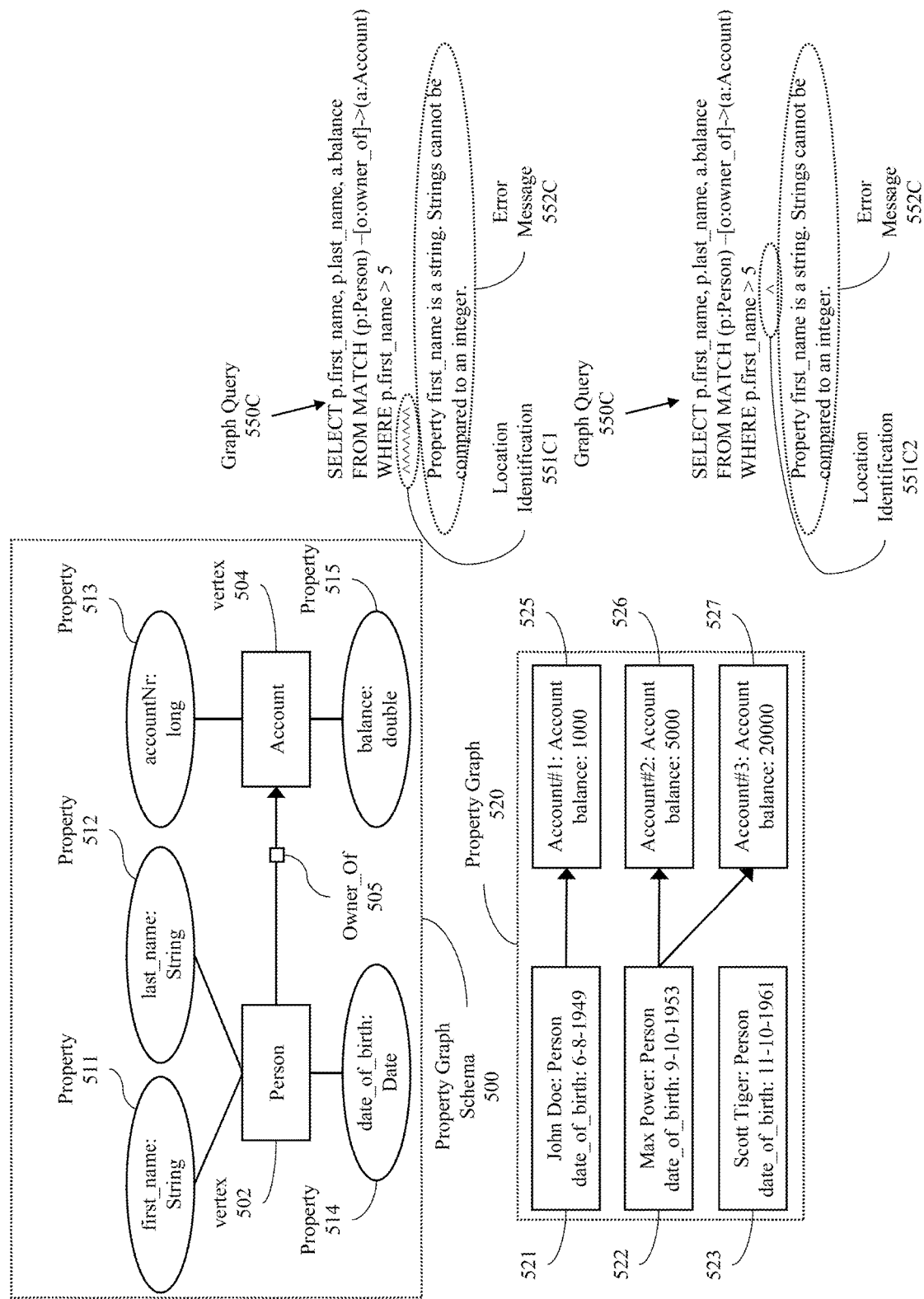

FIG. 5C provides an illustration of a presentation of an error identification corresponding to a data type mismatch for a comparison. Here the property graph schema 500 and the property graph 520 are the same as illustrated in FIG. 5A, thus the description provided therein is applicable here.

For the sake of illustration, the query is identical to the graph query 550A except that a WHERE clause has been added (see 550C1 and 550C2). Here, the comparison operates on a name represented by a string (p.first_name) and an integer ("5"). Generally, a graph query that compares a string to a number cannot be executed. Thus, this comparison represents an error. The presence and location of this error may be identified as illustrated—e.g., by a caret symbol(s) below the offending clause (551C1) or below the offending operator (551C2). Additionally, an error message is provided (see 552C). As discussed herein, in another embodiment, a different type of emphasis could be used (e.g., underlining or changing the color to red in an integrated development environment).

Figure 5D:
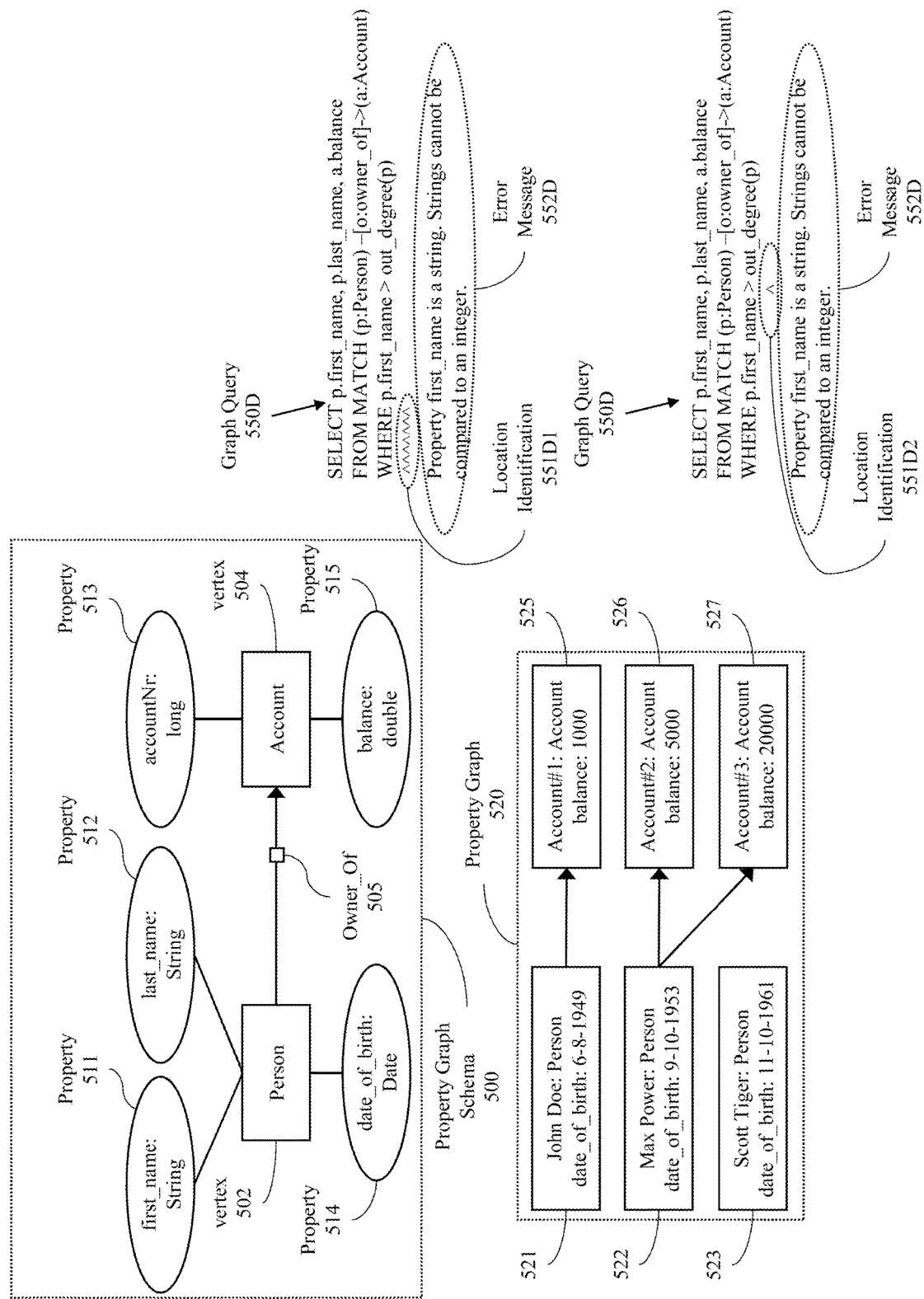

FIG. 5D provides an illustration of a presentation of an error identification corresponding to a data type mismatch for a comparison where one of the operands is a value returned by a function. Here the property graph schema 500 and the property graph 520 are the same as illustrated in FIG. 5A, thus the description provided therein is applicable here.

As illustrated, instead of a direct comparison to an integer ("5") discussed in FIG. 5C, the present example compares a first value (p.first_name) to an output of a function (outdegree(p)) (see graph query 550D). Outdegree(p) might comprise a function that determines a number of outgoing edges for the vertex identified as a variable passed to the function (e.g., p). However, the number here would comprise an integer. Thus, as disclosed herein, the present approach can be used to evaluate a built-in function or a user-defined function to determine what type of data the function will return, and generate a corresponding error message if this results in a data type mismatch. The presence and location of this error may be identified as illustrated—e.g., by a caret symbol(s) below the offending clause (551D1) or below the offending operator (551D2). Additionally, an error message is provided (see 552D). As discussed herein, in another embodiment, a different type of emphasis could be used (e.g., underlining or changing the color to red in an integrated development environment).

Figure 5E:
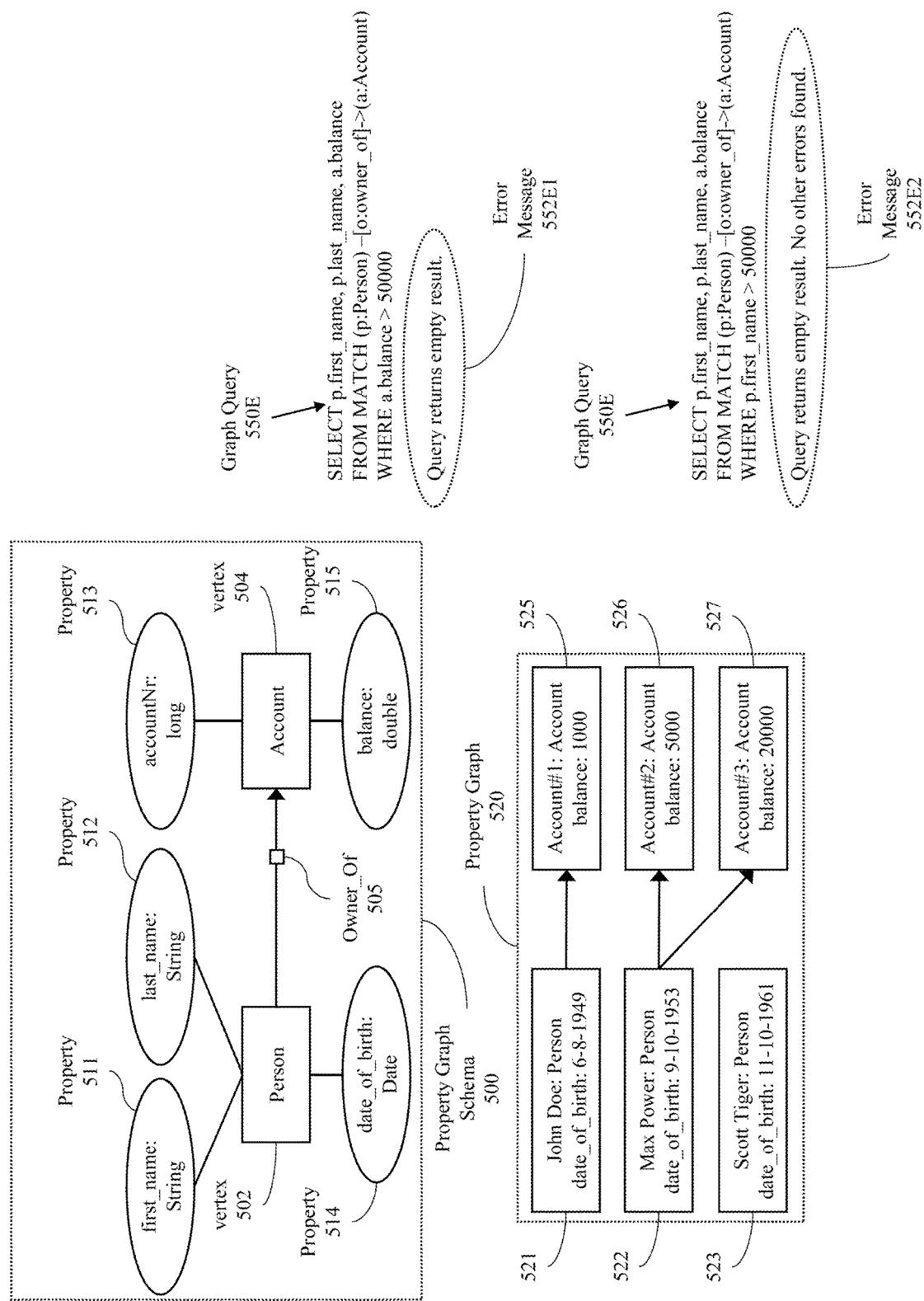

FIG. 5E provides an illustration of a presentation of an error identification corresponding to a query that returns an empty result. Here the property graph schema 500 and the property graph 520 are the same as illustrated in FIG. 5A, thus the description provided therein is applicable here.

As illustrated, instead of a direct comparison of a string to an integer as illustrated in FIG. 5C, the present example compares a first value (a number) to another number (see graph query 550E). Here, a.balance is a double precision floating point number and the number being compared to a.balance might be of the same type or a different type of integer that can be compared to a double precision floating point number. Regardless, the condition requires that any results have a.balance that is greater than 50,000. As can be seen no account includes a balance sufficiently large to meet this condition. Thus, the query would return an empty result even though the query is otherwise valid. Such an event might be identified to a user using an error message such as those illustrated at 522E1 and 522E2.

System Architecture

Figure 6:
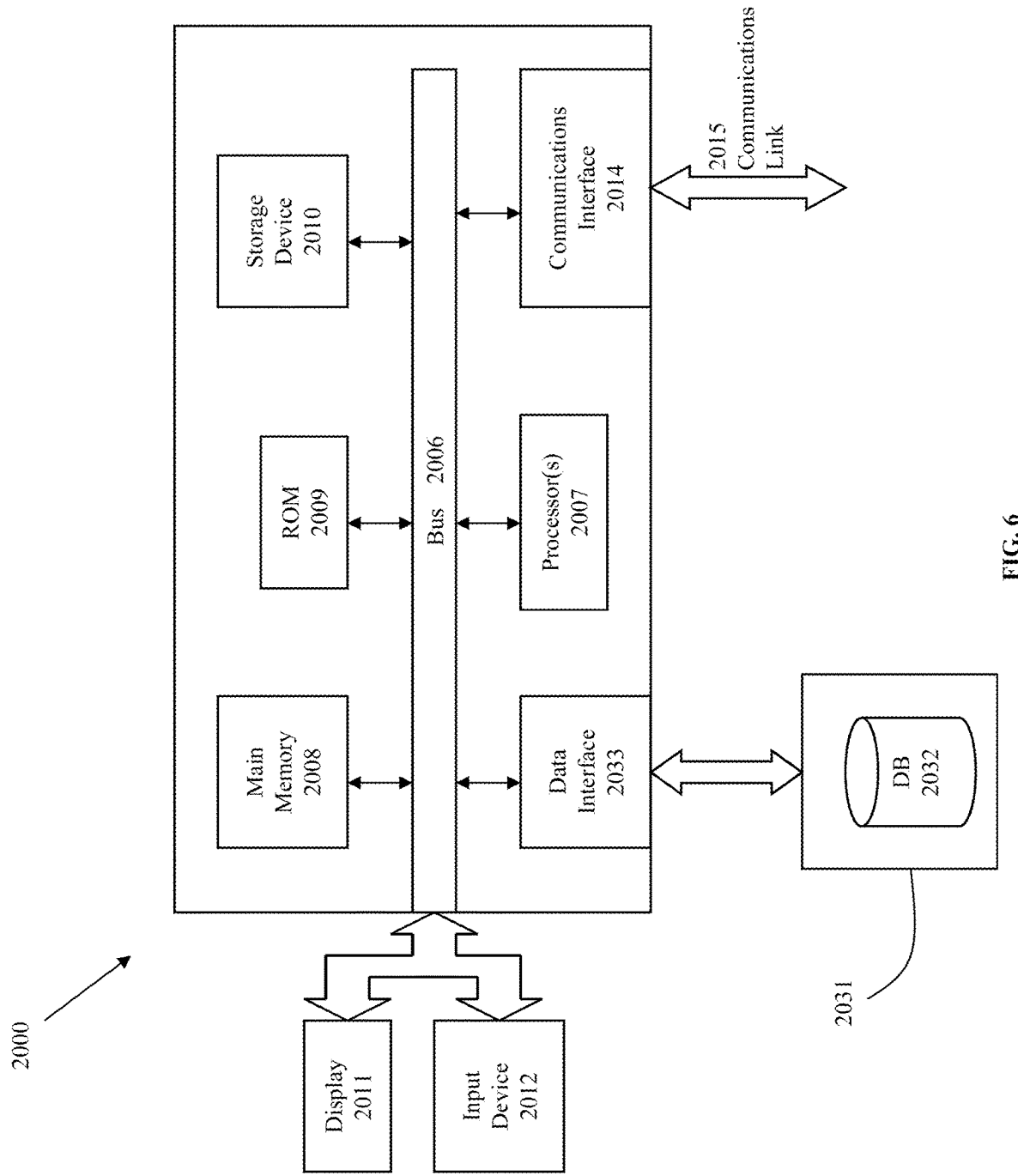
FIG. 6 is a diagram of a computing system suitable for implementing an embodiment of the present disclosure.

FIG. 6 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

Figure 7:
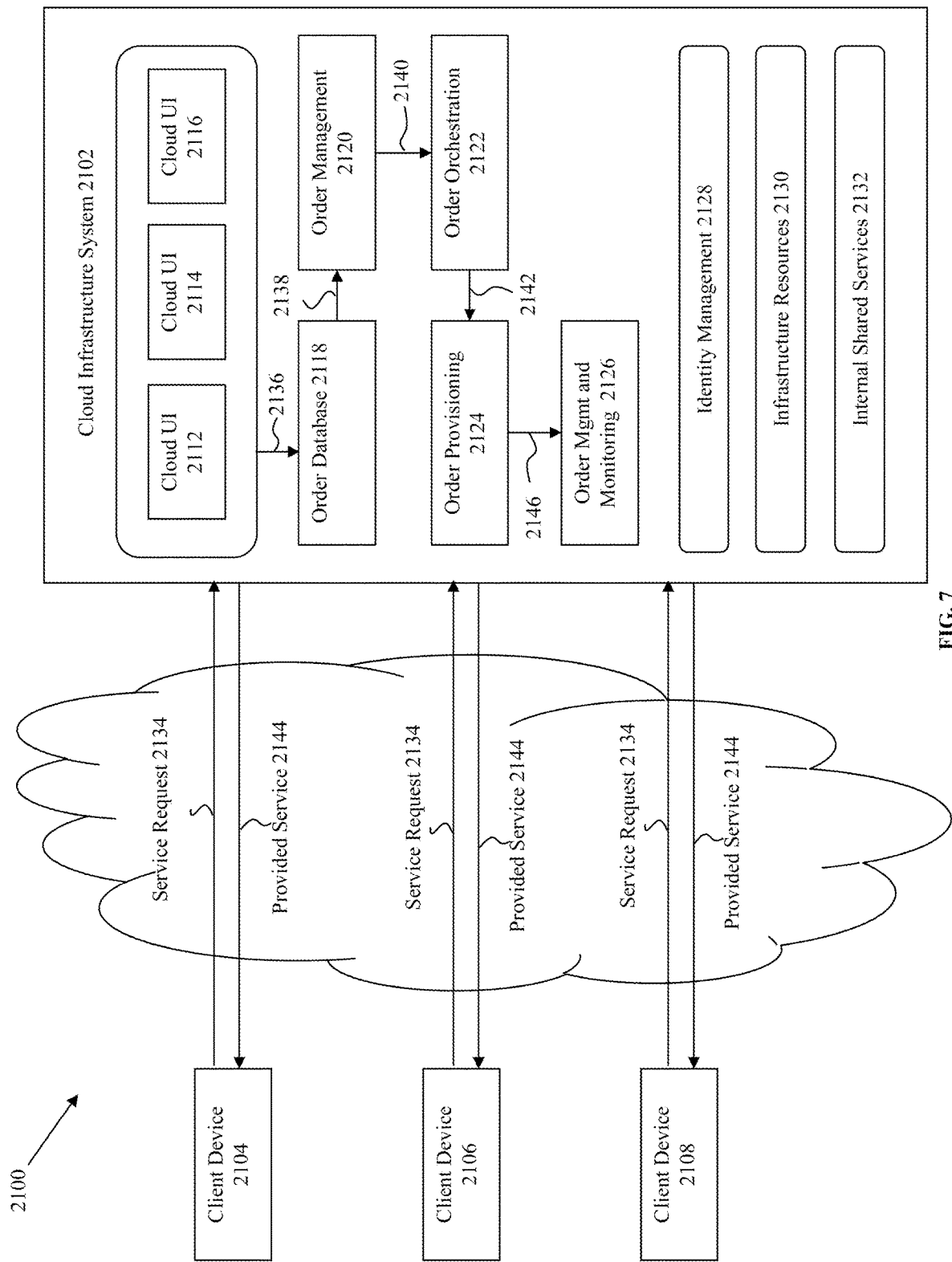
FIG. 7 is a block diagram of one or more components of a system environment in which services may be offered as cloud services, in accordance with an embodiment of the present invention.

FIG. 7 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 6. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for method, apparatus, and product for a parser for property graph queries with precise error reporting and auto-completion based on information from property graph schemas addresses at least some of the issues that prior techniques suffer from by providing feedback to a user that is both specific and prior to the execution of a query.

What is claimed is:

1. A computer-implemented method comprising:
    receiving, at a user interface, a property graph query directed towards a property graph;
    processing, prior to execution of the property graph query against the property graph, the property graph query against a previously stored property graph schema corresponding to the property graph by:
        accessing the previously stored property graph schema, wherein the previously stored property graph schema was generated by a property graph schema generator that traversed the property graph to identify relationships in the property graph and represents the relationships in the previously stored property graph schema,
        parsing the property graph query using one or more property graph validators to determine whether there is a mismatch between the property graph query and the previously stored property graph schema that was generated by the property graph schema generator that traversed the property graph; and
    generating an output for display at the user interface, wherein
        when an error in the property graph query is identified due to a mismatch between the property graph query and the previously stored property graph schema that was generated by the property graph schema generator that traversed the property graph, the output comprises an error message and an identification of a location in the property graph query corresponding to the error message, and
        when an error in the property graph query is not identified due to a mismatch between the property graph query and the previously stored property graph schema that was generated by the property graph schema generator that traversed the property graph, the output comprises a result of processing the property graph query against the property graph.

2. The method of claim 1, further comprising, when an error in the property graph query is not identified due to a mismatch between the property graph query and the previously stored property graph schema, determining whether the property graph query would return an empty result using a non-empty results validator by:
    processing the property graph query against the previously stored property graph schema to determine if the property graph query maps to a valid context,
    analyzing the property graph query against the property graph to determine whether at least one result would be provided in response to executing the property graph query, and
    when it is not determined that the property graph query maps to a valid context or it is not determined that at least one result would be provided in response to executing the property graph query the output for display further comprises an error message indicating that the property graph query returns an empty result.

3. The method of claim 1, wherein parsing the property graph query using one or more property graph validators to determine whether there is a mismatch between the property graph query and the previously stored property graph schema comprises:
    tokenizing the property graph query to generate a plurality of tokens,
    analyzing, using a label name validator, a first one or more tokens of the plurality of tokens against the previously stored property graph schema to identify any label name mismatches, and
    analyzing, using a property name validator, a second one or more tokens of the plurality of tokens against the previously stored property graph schema to identify any property name mismatches.

4. The method of claim 3, wherein tokens in the previously stored property graph schema are filtered to possible valid properties based on a corresponding vertex or edge prior to analyzing the second one or more tokens of the plurality of tokens against the previously stored property graph schema to identify any property name mismatches.

5. The method of claim 3, wherein one or more tokens corresponding to one or more errors identified by the label name validator or the property name validator are passed to an autocomplete suggester comprising at least a label name suggester or a property name suggester, and processing the one or more tokens at least by:
    identifying one or more valid label names or property names corresponding to the token based on one or more of pattern matching, heuristics, or a ranking schema, and wherein displaying the result for the property graph query further comprises displaying an autocomplete suggestion comprising the one or more valid label names or property names for the property graph query.

6. The method of claim 1, wherein parsing the property graph query using one or more property graph validators to determine whether there is a mismatch between the property graph query and the previously stored property graph schema comprises:

tokenizing the property graph query to generate a plurality of tokens, identifying a token of the plurality of tokens comprising a comparison operator, and analyzing one or more preceding tokens of the plurality of tokens against one or more proceeding tokens of the plurality of tokens against the previously stored property graph schema to identify any data type mismatches.

7. The method of claim 6, wherein a token of the one or more preceding tokens or the one or more proceeding tokens comprises a function, and a data type of the token is based on a data type of an operand returned by the function.

8. The method of claim 7, wherein the function is a user-defined function that is evaluated to determine the data type of the operand returned by the function.

9. A non-transitory computer readable medium having stored thereon a sequence of instructions which, when executed by a processor causes a set of acts comprising:

receiving, at a user interface, a property graph query directed towards a property graph;

processing, prior to execution of the property graph query against the property graph, the property graph query against a previously stored property graph schema corresponding to the property graph by:

accessing the previously stored property graph schema, wherein the previously stored property graph schema was generated by a property graph schema generator that traversed the property graph to identify relationships in the property graph and represents the relationships in the previously stored property graph schema, parsing the property graph query using one or more property graph validators to determine whether there is a mismatch between the property graph query and the previously stored property graph schema that was generated by the property graph schema generator that traversed the property graph; and generating an output for display at the user interface, wherein when an error in the property graph query is identified due to a mismatch between the property graph query and the previously stored property graph schema that was generated by the property graph schema generator that traversed the property graph, the output comprises an error message and an identification of a location in the property graph query corresponding to the error message, and when an error in the property graph query is not identified due to a mismatch between the property graph query and the previously stored property graph schema that was generated by the property graph schema generator that traversed the property graph, the output comprises a result of processing the property graph query against the property graph.

10. The non-transitory computer readable medium of claim 9, wherein the set of acts further comprise, when an error in the property graph query is not identified due to a mismatch between the property graph query and the previously stored property graph schema, determining whether the property graph query would return an empty result using a non-empty results validator by:

processing the property graph query against the previously stored property graph schema to determine if the property graph query maps to a valid context, analyzing the property graph query against the property graph to determine whether at least one result would be provided in response to executing the property graph query, and when it is not determined that the property graph query maps to a valid context or it is not determined that at least one result would be provided in response to executing the property graph query the output for display further comprises an error message indicating that the property graph query returns an empty result.

11. The non-transitory computer readable medium of claim 9, wherein parsing the property graph query using one or more property graph validators to determine whether there is a mismatch between the property graph query and the previously stored property graph schema comprises:

tokenizing the property graph query to generate a plurality of tokens, analyzing, using a label name validator, a first one or more tokens of the plurality of tokens against the previously stored property graph schema to identify any label name mismatches, and analyzing, using a property name validator, a second one or more tokens of the plurality of tokens against the previously stored property graph schema to identify any property name mismatches.

12. The non-transitory computer readable medium of claim 11, wherein tokens in the previously stored property graph schema are filtered to possible valid properties based on a corresponding vertex or edge prior to analyzing the second one or more tokens of the plurality of tokens against the previously stored property graph schema to identify any property name mismatches.

13. The non-transitory computer readable medium of claim 11, wherein one or more tokens corresponding to one or more errors identified by the label name validator or the property name validator are passed to an autocomplete suggester comprising at least a label name suggester or a property name suggester, and processing the one or more tokens at least by:

identifying one or more valid label names or property names corresponding to the token based on one or more of pattern matching, heuristics, or a ranking schema, and wherein displaying the result for the property graph query further comprises displaying an autocomplete suggestion comprising the one or more valid label names or property names for the property graph query.

14. The non-transitory computer readable medium of claim 9, wherein parsing the property graph query using one or more property graph validators to determine whether there is a mismatch between the property graph query and the previously stored property graph schema comprises:

tokenizing the property graph query to generate a plurality of tokens, identifying a token of the plurality of tokens comprising a comparison operator, and analyzing one or more preceding tokens of the plurality of tokens against one or more proceeding tokens of the plurality of tokens against the previously stored property graph schema to identify any data type mismatches.

15. The non-transitory computer readable medium of claim 14, wherein a token of the one or more preceding tokens or the one or more proceeding tokens comprises a function, and a data type of the token is based on a data type of an operand returned by the function.

16. The non-transitory computer readable medium of claim 15, wherein the function is a user-defined function that is evaluated to determine the data type of the operand returned by the function.

17. A computing system comprising:
a memory to hold a set of instructions;
a computer processor to execute the set of instructions, which when executed cause a set of acts comprising:
receiving, at a user interface, a property graph query directed towards a property graph;
processing, prior to execution of the property graph query against the property graph, the property graph query against a previously stored property graph schema corresponding to the property graph by:
accessing the previously stored property graph schema, wherein the previously stored property graph schema was generated by a property graph schema generator that traversed the property graph to identify relationships in the property graph and represents the relationships in the previously stored property graph schema,
parsing the property graph query using one or more property graph validators to determine whether there is a mismatch between the property graph query and the previously stored property graph schema that was generated by the property graph schema generator that traversed the property graph; and
generating an output for display at the user interface, wherein
when an error in the property graph query is identified due to a mismatch between the property graph query and the previously stored property graph schema that was generated by the property graph schema generator that traversed the property graph, the output comprises an error message and an identification of a location in the property graph query corresponding to the error message, and
when an error in the property graph query is not identified due to a mismatch between the property graph query and the previously stored property graph schema that was generated by the property graph schema generator that traversed the property graph, the output comprises a result of processing the property graph query against the property graph.

18. The computing system of claim 17, wherein the set of acts further comprise, when an error in the property graph query is not identified due to a mismatch between the property graph query and the previously stored property graph schema, determining whether the property graph query would return an empty result using a non-empty results validator by:
processing the property graph query against the previously stored property graph schema to determine if the property graph query maps to a valid context,
analyzing the property graph query against the property graph to determine whether at least one result would be provided in response to executing the property graph query, and
when it is not determined that the property graph query maps to a valid context or it is not determined that at least one result would be provided in response to executing the property graph query the output for display further comprises an error message indicating that the property graph query returns an empty result.

19. The computing system of claim 17, wherein parsing the property graph query using one or more property graph validators to determine whether there is a mismatch between the property graph query and the previously stored property graph schema comprises:
tokenizing the property graph query to generate a plurality of tokens,
analyzing, using a label name validator, a first one or more tokens of the plurality of tokens against the previously stored property graph schema to identify any label name mismatches, and
analyzing, using a property name validator, a second one or more tokens of the plurality of tokens against the previously stored property graph schema to identify any property name mismatches.

20. The computing system of claim 19, wherein tokens in the previously stored property graph schema are filtered to possible valid properties based on a corresponding vertex or edge prior to analyzing the second one or more tokens of the plurality of tokens against the previously stored property graph schema to identify any property name mismatches.

* * * * *

UNITED STATES PATENT AND TRADEMARK OFFICE
CERTIFICATE OF CORRECTION

PATENT NO.         : 12,271,402 B2
APPLICATION NO.    : 17/808083
DATED              : April 8, 2025
INVENTOR(S)        : Gratzer et al.

It is certified that error appears in the above-identified patent and that said Letters Patent is hereby corrected as shown below:

On the Title Page

Item [73], Line 2, delete "Redwood Shores (CA)" and insert -- Redwood Shores, (CA) --, therefor.

In the Specification

In Column 7, Line 31, delete "114d." and insert -- 114d --, therefor.

In Column 9, Line 20, delete "token." and insert -- token --, therefor.

In Column 10, Line 18, delete "114f" and insert -- 114f. --, therefor.

In Column 11, Line 56, delete "114E" and insert -- 114f. --, therefor.

In Column 14, Line 54, delete "PTSN," and insert -- PSTN, --, therefor.

In Column 15, Line 42, delete "Web-" and insert -- web- --, therefor.

Signed and Sealed this
Seventeenth Day of June, 2025

Coke Morgan Stewart
*Acting Director of the United States Patent and Trademark Office*